(12) United States Patent
Feldtkeller

(10) Patent No.: US 6,320,733 B1
(45) Date of Patent: Nov. 20, 2001

(54) PULSE-WIDTH MODULATOR FOR CONTROLLING A SEMICONDUCTOR CIRCUIT BREAKER

(75) Inventor: Martin Feldtkeller, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/383,871

(22) Filed: Aug. 26, 1999

Related U.S. Application Data

(63) Continuation of application No. PCT/DE98/00231, filed on Jan. 26, 1998.

(30) Foreign Application Priority Data

Feb. 26, 1997 (DE) .............................................. 197 07 707

(51) Int. Cl.$^7$ .................................................... H02H 3/18
(52) U.S. Cl. ..................... 361/87; 361/93.7; 323/282; 307/131
(58) Field of Search ................... 361/78, 79, 87, 361/93.1, 93.7, 100, 101; 307/98, 99, 106, 123, 116, 125, 129, 131, 139, 140; 323/282, 265, 283, 284

(56) References Cited

U.S. PATENT DOCUMENTS

| 4,750,079 | * | 6/1988 | Fay et al. ............................ 361/101 |
| 4,975,820 | | 12/1990 | Szzepesi . |
| 5,113,158 | | 5/1992 | Tsuji et al. . |
| 5,335,162 | | 8/1994 | Martin-Lopez et al. . |
| 5,390,101 | | 2/1995 | Brown . |
| 5,596,264 | * | 1/1997 | Bichler et al. ....................... 323/284 |
| 5,671,115 | * | 9/1997 | Streich .................................. 361/187 |
| 5,694,305 | * | 12/1997 | King et al. ............................. 363/21 |
| 5,867,379 | * | 2/1999 | Maksimovic et al. ................. 363/89 |

FOREIGN PATENT DOCUMENTS

| 19524963A1 | 1/1997 | (DE) . |
| 0576702A1 | 1/1994 | (EP) . |
| 0584623A1 | 3/1994 | (EP) . |
| 0588168A2 | 3/1994 | (EP) . |
| 0618678A2 | 10/1994 | (EP) . |

OTHER PUBLICATIONS

Japanese Patent Abstract No. 2–266611 (Kikuyama), dated Oct. 31, 1990.

* cited by examiner

Primary Examiner—Kim Huynh
(74) Attorney, Agent, or Firm—Herbert L. Lerner; Laurence A. Greenberg; Werner H. Stemer

(57) ABSTRACT

A pulse-width modulator for controlling a semiconductor circuit-breaker in a switched-mode power supply has a comparator circuit for generating control pulses determined by an oscillator signal. Whereby a duration of the individual control pulses depends on a first control signal and a second control signal. A measuring configuration is provided for generating a load-current signal that is dependent on a load current of the circuit-breaker. Furthermore, the modulator has a feedback branch for feeding back the load-current signal to the comparator circuit whereby the feedback branch has a low-pass configuration. The low-pass configuration has an input which receives the load-current signal and an output at which the second control signal can be picked off.

10 Claims, 5 Drawing Sheets

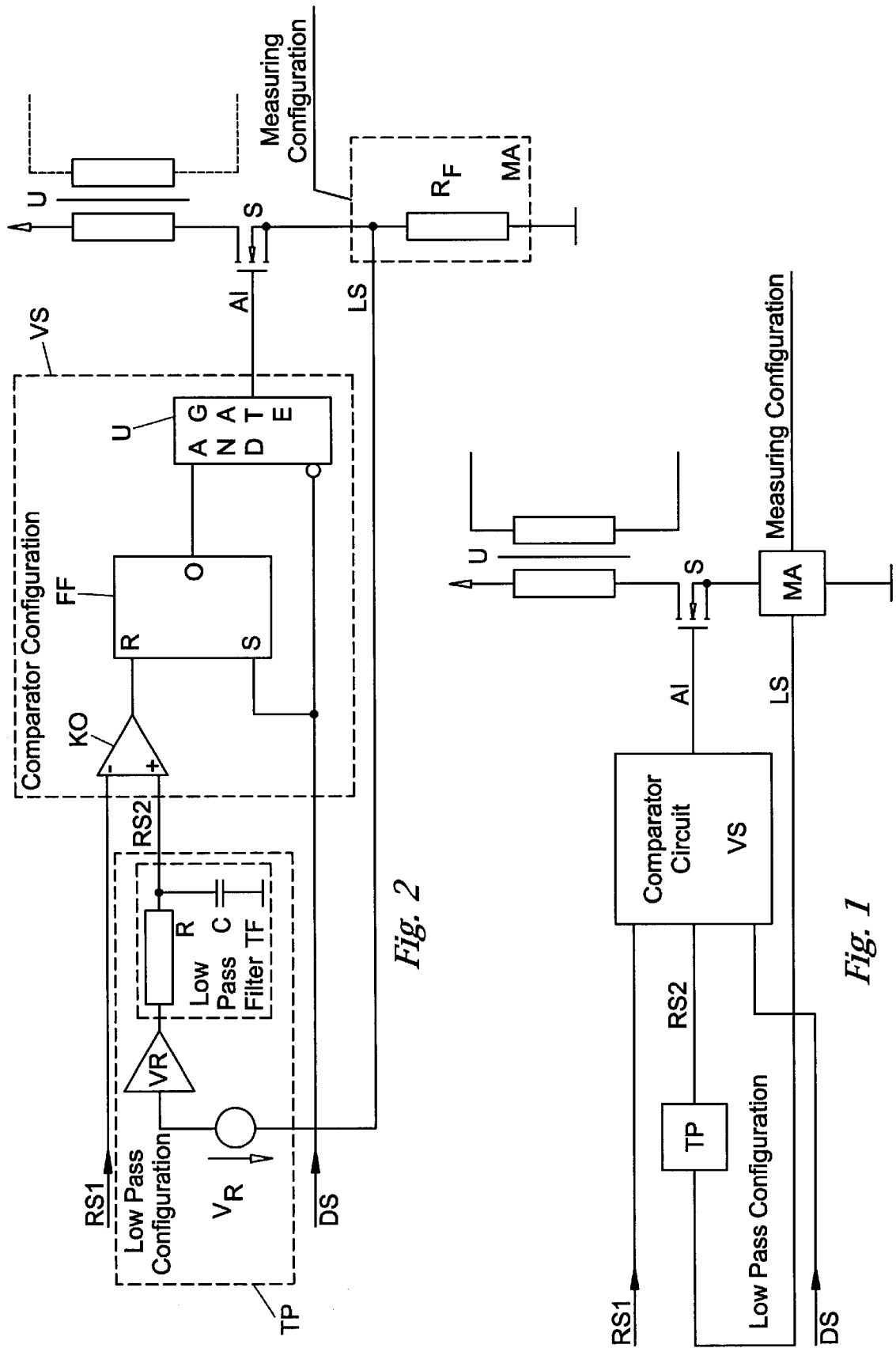

US 6,320,733 B1

PULSE-WIDTH MODULATOR FOR CONTROLLING A SEMICONDUCTOR CIRCUIT BREAKER

CROSS-REFERENCE TO RELATED APPLICATION

This is a continuation of copending International Application PCT/DE98/00231, filed Jan. 26, 1998, which designated the United States.

BACKGROUND OF THE INVENTION

Field of the Invention

The invention concerns a pulse-width modulator for controlling a semiconductor circuit-breaker in a switched-mode power supply. The pulse-width modulator contains a comparator circuit for generating control pulses determined by an oscillator signal, whereby a duration of the individual control pulses depends on a first control signal and a second control signal. A measuring configuration is provided for generating a load-current signal dependent on the load current of the circuit-breaker. A feedback branch for feedback of the load-current signal to the comparator circuit is also provided. The feedback branch has a low-pass configuration with an input that receives the load-current signal and an output at which the second control signal can be picked off.

Pulse-width modulators of this kind serve for controlling the output voltage or the output power of a switched-mode power supply.

A pulse-width modulator with the above features is known, for example, from U.S. Pat. No. 5,390,101.

Furthermore, Published, European Patent Application EP 0 584 623 A1 discloses a converter for generating a constant output voltage with a current-mode regulator, which converter has a post-connected R-C element for achieving freedom from peaks whereby the peaks always arise at the beginning of the switch-on phase of the circuit-breaker.

The power input or output of the switched-mode power supply depends among other things on the duration of the periodically generated control pulses, which effect closure of the semiconductor circuit-breaker for the duration of the control pulse and therewith cause a load current to flow. Control of the duration of the control pulses, which are normally generated at the clock frequency of the oscillator signal, takes place in the circuit configuration in dependence on the first and a second control signals and whereby the first control signal depends among other things on the output voltage or output power of the switched-mode power supply.

Thus in the prior art pulse-width modulators for controlling the semiconductor circuit-breaker closure of the semiconductor circuit-breaker takes place at the clock frequency of the oscillator signal, whereby the semiconductor circuit-breaker is opened again in dependence on the sequence of the first and second control signals. Normally the control pulses are selected such that they end when the second control signal exceeds the first control signal, as a result of which the semiconductor circuit-breaker is opened.

In prior art pulse-width modulators of this kind the load-current signal is fed back to the comparator circuit either directly or through an amplifier. As a result of unavoidable parasitic capacitances, a short, high switch-on current pulse arises in the load current flowing in the switched-mode power supply after the semiconductor circuit-breaker is switched on, which if fed back directly into the comparator circuit as a second control signal would result in the semiconductor circuit-breaker being switched off immediately after being switched on if the switch-on pulse exceeds the first control signal. These kinds of pulse-width modulators for controlling the semiconductor circuit-breaker therefore have configurations in the feedback branch which blank out the load-current signal at the beginning for a period which is longer than the duration of the switch-on pulses.

A disadvantage of these kinds of pulse-width modulator is that it is not possible to generate any control pulses with a duration shorter than the period during which the load-current signal is blanked out. Because the power output of the switched-mode power supply depends on the duration of the control pulses, there is a lower limit to output power of a switched-mode power supply with a pulse-width modulator of this kind.

SUMMARY OF THE INVENTION

It is accordingly an object of the invention to provide a pulse-width modulator that overcomes the above-mentioned disadvantages of the prior art devices of this general type, in which control pulses can be generated with as short a duration as required and independent of a switch-on current pulse, and which is realizable through simple construction. A further object is that the pulse-width modulator is highly reliable.

With the foregoing and other objects in view there is provided, a pulse-width modulator for controlling a semiconductor circuit-breaker in a switched-mode power supply. The pulse-width modulator, includes a comparator circuit for receiving an oscillator signal, a first control signal, and a second control signal. The comparator circuit generating control pulses in dependence on the oscillator signal, the control pulses each having a duration being dependent on the first control signal and the second control signal. The pulse with modulator having a measuring configuration for receiving a load current from a semiconductor circuit-breaker and generating a load-current signal being dependent on the load current of the semiconductor circuit-breaker; and a feedback branch feeding back the load-current signal from the measuring configuration to the comparator circuit, the feedback branch having a low-pass configuration with an input receiving the load-current signal and an output supplying the second control signal, the low-pass configuration having a low-pass filter and a switching configuration providing a signal fraction of the second control signal, the signal fraction being independent of the load-current signal.

The object is achieved with the pulse-width modulator noted above. A key addition is that the low-pass configuration has a low-pass filter and a circuit configuration which provides a fraction of the signal of the second control signal. The fraction additionally being independent of the load-current signal.

The low-pass configuration exerts the effect that a useful fraction of the load-current signal, which generally increases more slowly and is thus of lower frequency, is integrated almost unfiltered into the second control signal whereas the short, and thus high frequency, interfering fraction of the load-current signal is suppressed through the low-pass configuration. In the presence of the low-pass configuration it is not necessary to blank out the load-current pulse for a specific length of time after opening the circuit-breaker so that, in particular, it is possible to generate control pulses as short as required.

The low-pass configuration has a low-pass filter and a switching configuration whereby the latter provides a fraction of the signal of the second control signal, which fraction is independent of the load-current signal. The switching configuration is chosen such that the signal fraction, which is independent of the load current, supplements the signal fraction of the second control signal resulting from the load current to a monotonically increasing signal as long as the semiconductor circuit-breaker is closed. The low-pass filter and the switching configuration are chosen such that even in the case of small load currents and resulting small load current signals a strictly monotonically increasing second control signal is available for the duration of the control pulses, as a result of which control pulses as small as required are possible.

The low-pass filter is preferably a first order filter which can therefore be realized simply and in a space-saving way.

To enable the first and second control signals to be mutually balanced the low-pass configuration preferably has an amplifier. This also serves, for example, to amplify before low-pass filtering the load-current signal or a signal dependent on this in order to reduce the influence on the second control signal of further disturbance caused through parasitic effects.

One embodiment of the pulse-width modulator according to the invention provides that the switching configuration consists of a square-wave signal source disposed before the low-pass filter. The square-wave pulses supplied by the square-wave signal source are chosen such that they begin at or just before the switching-on of the semiconductor circuit-breaker and end at or after the switching-off of the semiconductor circuit-breaker. The amplitude of the square-wave signals is chosen such that the second control signal, which is formed through low-pass filtering of the sum signal of the square-wave signal and the load-current signal, increases strictly monotonically as long as the semiconductor circuit-breaker is closed.

The measuring configuration preferably contains a current-sensing resistor through which the load current flows, which resistor is connected to a reference potential at a first terminal and at a second terminal of which the load-current signal can be picked off. Thus the load-current signal arises from the voltage drop generated through the load current at the current-sensing resistor.

It is further provided that the low-pass filter consists of a resistor and a capacitor whereby a first terminal of the capacitor is connected to the reference potential and at the second terminal of which the second control signal can be picked off.

A further embodiment of the pulse-width modulator according to the invention provides that the switching configuration consists of a constant-voltage source and a first switch which is disposed in parallel to the capacitor of the low-pass filter and which is opened or closed in dependence on a step signal provided in the switching configuration. The step signal is chosen such that it opens the first switch when the semiconductor circuit-breaker closes and closes again after the semiconductor circuit-breaker is opened again. In an analogous way to the above square-wave signal the voltage of the constant voltage source is chosen such that a monotonically increasing signal arises for the second control signal as long as the semiconductor circuit-breaker is closed. The first switch, disposed in parallel to the capacitor, ensures that the capacitor is discharged after the opening of the semiconductor circuit-breaker and that the low-pass filter enters a defined initial state before the semiconductor circuit-breaker is closed again.

An equivalent effect is produced by a further embodiment of the switching configuration in which a first current source is connected with a terminal with the common connection of capacitor, resistor and first switch, whereby the first switch is opened or closed depending on the step signal. The fraction of the second control signal provided by the first current source arises from the voltage drop at the resistor caused by the current source.

It is further provided that the switching configuration consists of a second current source and a second switch connected in series to it, whereby one terminal of the series circuit is connected with the common terminal of the resistor and the capacitor and whereby the second switch is opened or closed in dependence on the step signal. This switching configuration produces a square-wave shaped voltage drop at the resistor of the low-pass filter, which voltage drop is periodic with the period of the step signal. The voltage drop thus generated is equivalent to the addition of a square-wave shaped voltage signal to the load-current signal before filtering through the low-pass filter. The step signal must be chosen such that it closes the second switch when the semiconductor circuit-breaker is switched-on and opens the second switch again after the semiconductor circuit-breaker has opened.

The comparator circuit is preferably chosen such that it has a comparator, an R-S flip-flop and an AND gate. Whereby the comparator is connected on an input side with the first and second control signals. The R-S flip-flop is connected on an input side with the output of the comparator and with the oscillator signal, and the AND gate is connected on the input side with an output signal of the R-S flip-flop and with the oscillator signal. The control pulses lie at the output of the AND gate.

The pulse-width modulator according to the invention is suitable for both primary clocked and secondary clocked switched-mode power supplies.

Other features which are considered as characteristic for the invention are set forth in the appended claims.

Although the invention is illustrated and described herein as embodied in a pulse-width modulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, block diagram of a first exemplary embodiment of a pulse-width modulator according to the invention;

FIG. 2 is a block circuit diagram of a second exemplary embodiment of the pulse-width modulator;

DESCRIPTION OF THE PREFERRED EMBODIMENTS

Figure 3:
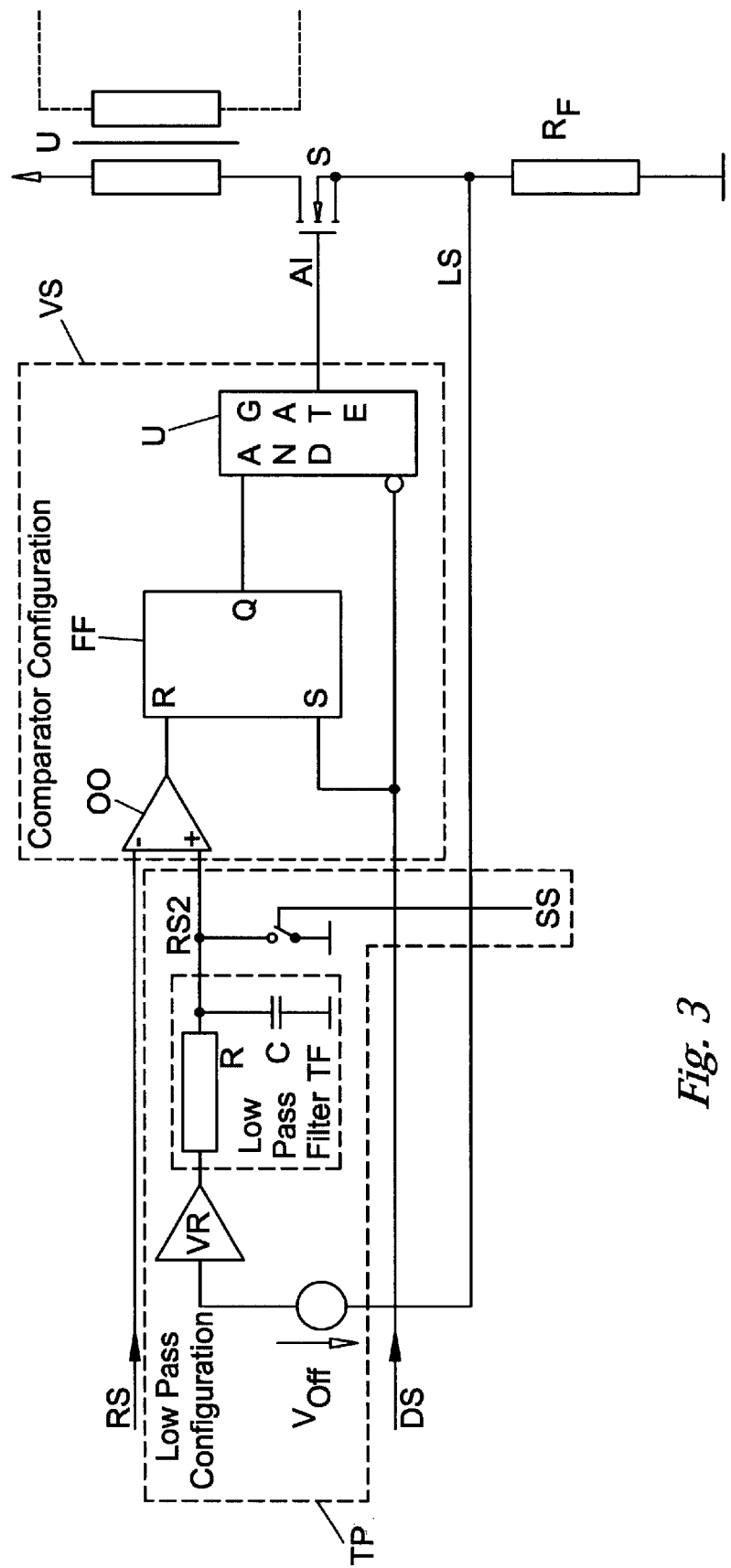
FIG. 3 is a block circuit diagram of a third exemplary embodiment of the pulse-width modulator.

In all the figures of the drawing, sub-features and integral parts that correspond to one another bear the same reference symbol in each case. Referring now to the figures of the drawing in detail and first, particularly, to FIG. 1 thereof, there is shown a first embodiment of a pulse-width modulator according to the invention for controlling a semiconductor circuit-breaker S in a primary clocked switched-mode power supply. Of the remaining components of the switched-mode power supply, a transformer Ü is illustrated. On a primary-side coil of the transformer Ü the semiconductor circuit-breaker S is connected in series. Also illustrated is a comparator circuit VS which generates control pulses AI clocked by an oscillator signal OS, whereby a duration of the control pulses AI is dependent on a first and second control signal RS1, RS2. A measuring configuration MA generates a load-current signal LS that is dependent on a load current flowing through the semiconductor circuit-breaker S. The load-current signal LS is fed back through a low-pass configuration TP in a feedback branch to the comparator circuit VS, whereby the second control signal RS2 is provided at an output of the low-pass configuration. The comparator circuit VS is chosen such that it generates the control pulses AI at the clock rate of the oscillator signal OS so that the semiconductor circuit-breaker S is opened with the period of the oscillator signal OS, whereby the opening duration is dependent on the duration of the control pulse AI.

FIG. 2 shows a further exemplary embodiment of the pulse-width modulator according to the invention. The measuring configuration MA is formed in the illustrated exemplary embodiment as a resistor $R_F$ which is connected with a first terminal to a reference potential and at a second terminal of which the load-current signal LS can be picked off. The illustrated comparator circuit VS consists of a comparator KO, an R-S flip-flop FF and an AND gate U, whereby the first and second control signals RS1, RS2 are connected to the inputs of the comparator KO. The output of the comparator KO is connected to the reset input of the R-S flip-flop FF. The oscillator signal OS is received at a set input of the R-S flip-flop FF, which oscillator signal OS is connected further to an inverting input of the AND gate U. The output of the RS flip-flop FF is connected with a further input of the AND gate U. The control pulses AI are connected to the output of the AND gate.

The low-pass configuration TP illustrated in FIG. 2 consists of a low-pass filter TF formed of an R-C element, an amplifier VR connected to the low-pass filter TF, and a square-wave signal source $V_R$ which adds a square-wave signal to the load-current signal LS connected to the input of the low-pass configuration TP.

The illustrated comparator circuit VS is chosen such that it generates control pulses AI which each begin with a negative clock-pulse edge of the oscillator signal OS. Each of the control pulses AI ends when the second control signal RS2 is greater than the first control signal RS1. The square-wave signal source $V_R$ is chosen such that it generates square-wave signals which in addition to the load-current signal LS followed by low-pass filtering produces the second control signal RS2 which increases strictly monotonically as long as the semiconductor circuit-breaker S is closed or as long as the control pulse AI is connected to the output of the comparator circuit VS.

The time constant of the R-C element is preferably chosen such that it is greater than the duration of the switch-on pulse contained in the load-current signal LS but smaller than the maximum possible duration of the control pulses AI. Because of the square-wave signal the load-current signal has only a slight influence on the second control signal RS2 when the load current is small so that at low load-currents the pulse-width modulator functions in voltage mode operation as known from conventional switched-mode power supplies, which mode is characterized in that the duration of the control pulses A1 is independent of the load current actually flowing. For larger load currents and the consequent higher power delivered by the switched-mode power supply, the second control signal RS2 becomes increasingly dependent on the load current.

FIG. 3 shows the pulse-width modulator illustrated in FIG. 2, whereby in the low-pass configuration TP, the square-wave signal source has been replaced by a constant voltage source $V_{OFF}$ and the low-pass configuration also has a first switch S1 which is connected in parallel to the capacitor C of the low-pass filter TF. The opening and closing of the first switch S1 proceeds in dependence on a step signal SS. Both the square-wave signal source $V_R$ shown in FIG. 2 and the constant voltage source $V_{OFF}$ shown in FIG. 3 form in combination with the first switch S1 a switching configuration which provides a signal fraction of the second control signal RS2, which fraction is independent of the load-current signal LS. In the example shown in FIG. 3 the voltage of the constant voltage source $V_{OFF}$ is added to the load-current signal, whereby the sum signal, after amplification through the amplifier VR and low-pass filtering through the low-pass filter TF, produces the control signal RS2. The first switch S1, which is opened at the beginning of the control pulse AI or on closing of the semiconductor circuit-breaker S, closes after the end of a respective control pulse AI or after the opening of the semiconductor circuit-breaker S and thereby ensures that the capacitor C is discharged before the beginning of a new control pulse AI and that the low-pass filter TF therefore enters a defined initial state.

Figure 4:
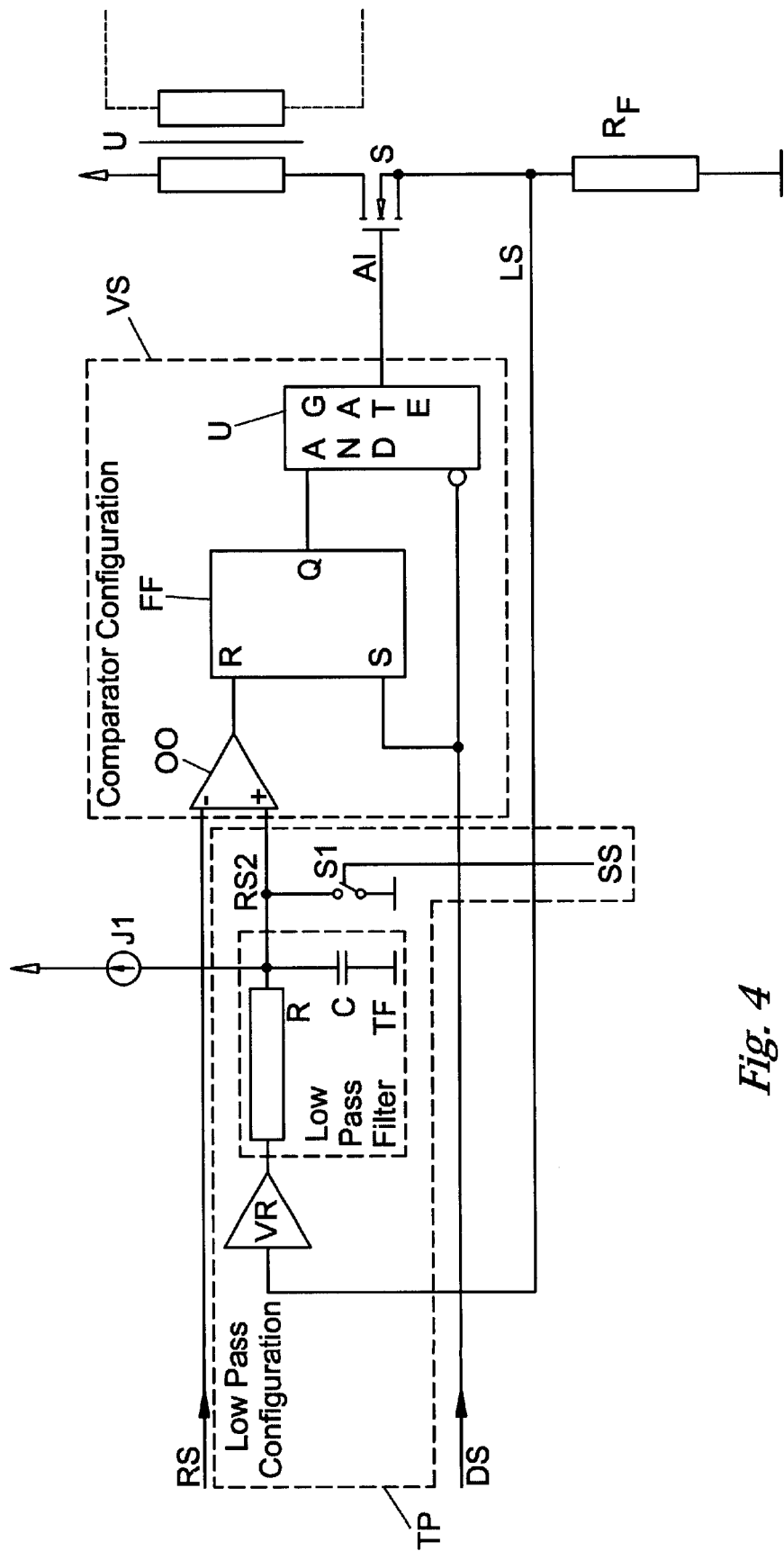
FIG. 4 is a block circuit diagram of a fourth exemplary embodiment of the pulse-width modulator.

The pulse-width modulator illustrated in FIG. 4 differs from that illustrated in FIG. 3 through a first current source J1 which is connected to the common terminal of the resistor R, the capacitor C and the first switch S1 and which replaces the constant voltage source $V_{OFF}$ shown in FIG. 3. In the example shown a second terminal of the first current source J1 is connected with a terminal V being a supply voltage. The voltage drop generated at the resistor R through the first current source J1 provides a signal fraction at the second control signal RS2, which signal fraction is independent of the load-current signal LS. The first switch S1, which is opened at the beginning of the control pulse A1 or with the closing of the semiconductor circuit-breaker S through the step signal SS, is closed after the end of a respective control pulse AI or after the opening of the semiconductor circuit-breaker S and ensures that the capacitor C is discharged before the beginning of a new control pulse AI and that the low-pass filter TF therefore enters a defined initial state.

Figure 5:
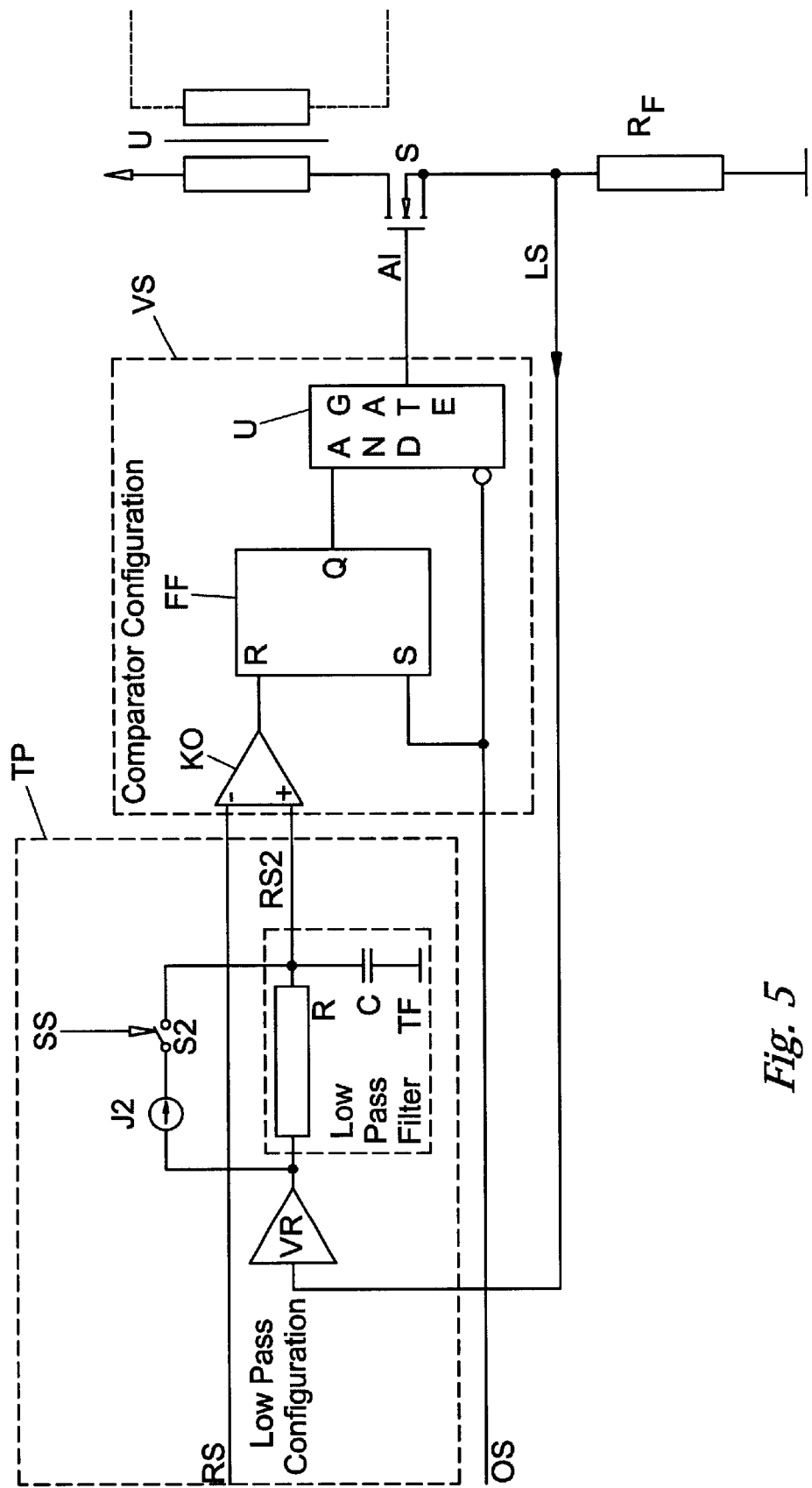
FIG. 5 is a block circuit diagram of a fifth exemplary embodiment of the pulse-width modulator.
Figure 6A:
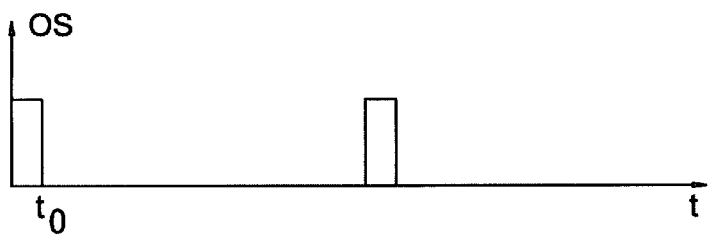
FIGS. 6a–6f are graphs of the chronological sequence of selected signals for purposes of explaining the function of the pulse-width modulator.
Figure 6B:
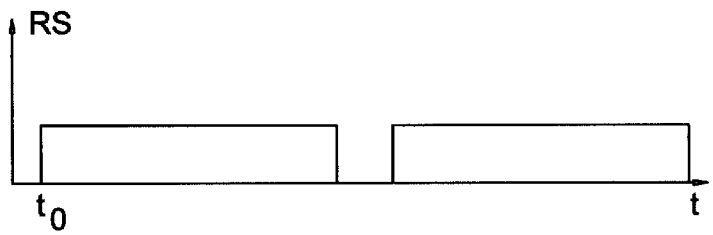
Figure 6C:
Figure 6D:
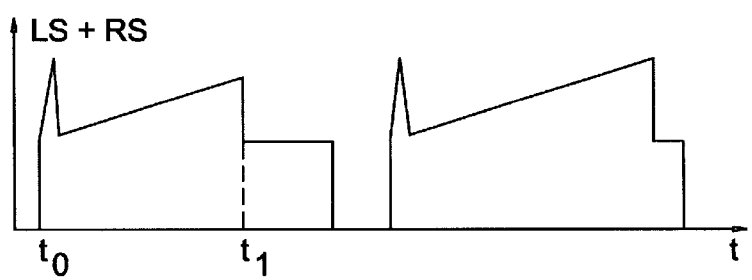
Figure 6E:
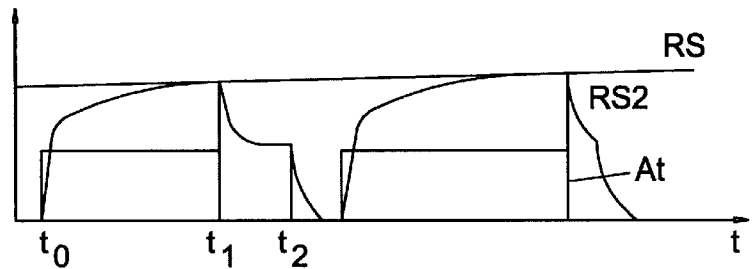
Figure 6F:
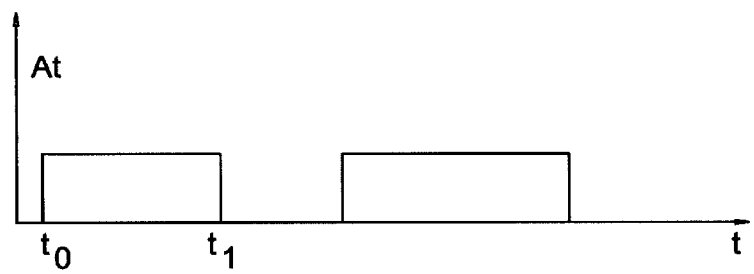

FIG. 5 shows the pulse-width modulator with a different low-pass configuration TP compared with the pulse-width modulators illustrated in FIGS. 2 to 4. A further switching configuration is illustrated for the generation of a signal fraction of the second control signal RS2, which signal fraction is independent of the load-current signal LS. The switching configuration consists of a second constant current source J2 and a second switch S2 connected to it in series. One terminal of the series circuit is connected with the common terminal of the resistor R and the capacitor C while the other terminal of the series circuit in the example illustrated is connected with the other terminal of the resistor R. The other terminal of the series circuit can also be connected with a terminal for any required potential in order to guarantee the functional capability of the circuit. The opening and closing of the second switch S2 takes place in dependence on the step signal mentioned above. Controlled through the second switch S2 in connection with the step signal SS, the second current source J2 causes a voltage drop at the resistor R with a clock frequency of the step signal SS, whereby the square-wave voltage drop is added to the load-current signal LS before the low-pass filter.

FIGS. 6a–6f shows the method of functioning of the pulse-width modulator according to the invention on the basis of selected signals of the pulse-width modulator illustrated in FIG. 2. FIGS. 6a to 6f show in this order the chronological sequences of the oscillator signal OS, the square-wave signal RS of the square-wave signal source $V_R$, the load-current signal LS, the sum signal formed from the load-current signal LS and the square-wave signal RS, the first and second control signals RS1, RS2, and the control pulses AI.

As can be clearly seen in FIGS. 6a–6f, the control pulses AI each begin with the falling clock-pulse edge of the oscillator signal OS. The load-current signal LS has a switch-on pulse at the beginning and then changes into a linearly increasing signal. The square-wave signals RS of the square-wave signal source $V_R$ are chosen such that they each begin with the falling clock-pulse edge of the oscillator signal OS and do not end until after the end of the control pulses AI. The control pulses AI, the duration of which depends on the first and second control signal, end when the second control signal RS2 is greater than the first control signal RS1. For comparing the signals, two time points to and ti are given as examples in FIGS. 6a–6f, whereby at time point to one of the control pulses AI begins and this control pulse ends at time point $t_1$.

I claim:

1. A pulse-width modulator for controlling a semiconductor circuit-breaker in a switched-mode power supply, the pulse-width modulator comprising:
   a comparator circuit for receiving an oscillator signal, a first control signal, and a second control signal, said comparator circuit generating control pulses in dependence on the oscillator signal, the control pulses each having a duration dependent on the first control signal and the second control signal;
   a measuring configuration for receiving a load current from a semiconductor circuit-breaker and generating a load-current signal dependent on the load current of the semiconductor circuit-breaker; and
   a feedback circuit generating the second control signal by adding the load-current signal to a constant signal when the semiconductor circuit breaker is closed, said feedback circuit including a filter for filtering out high-frequency components of the load-current signal.

2. The pulse-width modulator according to claim 1, wherein said low-pass filter is a first order filter.

3. The pulse-width modulator according to claim 1, wherein said low-pass configuration has an amplifier.

4. The pulse-width modulator according to claim 1, wherein said switching configuration includes a square-wave signal source disposed upstream of said low-pass filter.

5. The pulse-width modulator according to claim 1, wherein said measuring configuration includes a current-sensing resistor through which the load current flows, said current-sensing resistor having a first terminal to be connected to a reference potential and a second terminal at which the load-current signal can be picked off.

6. The pulse-width modulator according to claim 1, wherein said filter is a low-pass filter having a resistor and a capacitor with a first terminal to be connected to a reference potential and a second terminal at which the second control signal can be picked off.

7. The pulse-width modulator according to claim 6, wherein said feedback circuit includes a switching configuration that receives a step signal and that has a constant voltage source and a switch, said switch disposed in parallel with said capacitor and opened and closed in dependence on the step signal.

8. The pulse-width modulator according to claim 6, wherein said feedback circuit includes a switching configuration that receives a step signal and that has a current source and a switch, said switch disposed in parallel with said capacitor and is opened and closed in dependence on the step signal, said resistor and said capacitor are connected to each other at a common terminal and said current source has a terminal connected to said common terminal of said resistor and said capacitor.

9. The pulse-width modulator according to claim 6, wherein said feedback circuit includes a switching configuration that receives a step signal, said switching configuration has a current source and a switch connected in series to said current source, said resistor and said capacitor are connected to each other at a common terminal and said series circuit has a terminal connected to said common terminal of said resistor and said capacitor, and said switch is opened and closed in dependence on the step signal.

10. The pulse-width modulator according to claim 1, wherein said comparator circuit has a comparator with an output, and R-S flip-flop with an input side and an AND gate with an input side, said comparator has an input side receiving the first control signal and the second control signal, said input side of said R-S flip-flop is connected to said output of said comparator and receives the oscillator signal, said R-S flip-flop generating an output signal, and said input side of said AND gate receiving the output signal of said R-S flip-flop and the oscillator signal.

* * * * *